United States Patent [19]

Naef et al.

[11] Patent Number: 5,180,710
[45] Date of Patent: Jan. 19, 1993

[54] ETHYL (2E,4Z,7Z)-2,4,7-DECATRIENOATE AND ITS USE AS A PERFUMING OR FLAVORING INGREDIENT

[75] Inventors: Ferdinand Naef, Carouge; René Decorzani, Onex; Regula Naef, Carouge; Pierre-Alain Blanc, Crassier; Nicole van Beem, Dully, all of Switzerland

[73] Assignee: Firmenich S.A., Geneva, Switzerland

[21] Appl. No.: 773,054

[22] Filed: Oct. 8, 1991

[30] Foreign Application Priority Data

Oct. 22, 1990 [CH] Switzerland .................. 3361/90

[51] Int. Cl.$^5$ ................................ A61K 7/46
[52] U.S. Cl. ........................ 512/26; 426/534; 252/174.11; 252/8.6; 554/224
[58] Field of Search .............. 512/26; 426/534; 260/410.9 R; 252/174.11, 8.6

[56] References Cited

U.S. PATENT DOCUMENTS

| 3,579,550 | 5/1971 | Demole | 512/26 |
| 3,712,922 | 1/1973 | Henrick et al. | 512/26 |
| 3,953,377 | 4/1976 | Naf | 512/26 |
| 4,609,492 | 9/1986 | Hata et al. | 512/26 |

FOREIGN PATENT DOCUMENTS 0269999 6/1988 Fed. Rep. of Germany ........ 512/26

OTHER PUBLICATIONS

R. K. Creveling et al., "Volatile Components of Bartlett Pear", Journal of Agricultural and Food Chemistry, vol. 18, No. 1, Jan. 1970, pp. 19-24.
P. Schreier et al., "Volatile Constituents from Concord, Niagara (*Vitis labrusca, L.*) and Elvira (*V. labrusca, L. x V. riparia, M.*) Grapes", Canadian Institute of Food Science and Technology Journal, vol. 14, No. 2, Apr. 1981, pp. 112-118.
Briscout, Inc Alim Agr., p. 277 (1977).

*Primary Examiner*—James H. Reamer
*Attorney, Agent, or Firm*—Pennie & Edmonds

[57] ABSTRACT

Ethyl (2E,4Z,7Z)-2,4,7-decatrienoate, a novel compound, is a useful perfuming ingredient capable of imparting odor notes of the pear, green, violet leaf type to the compositions and articles into which it is incorporated. It can also be advantageously used in a variety of flavoring compositions.

5 Claims, No Drawings

ETHYL (2E,4Z,7Z)-2,4,7-DECATRIENOATE AND ITS USE AS A PERFUMING OR FLAVORING INGREDIENT

BRIEF SUMMARY OF THE INVENTION

The present invention relates to a method to confer, improve, enhance or modify the organoleptic properties of a perfuming or flavoring composition, or a perfumed or flavored article, which method comprises adding to said composition or article an effective amount of ethyl (2E,4Z,7Z)-2,4,7-decatrienoate.

The invention also has as its object a perfuming or flavoring composition containing ethyl (2E,4Z,7Z)-2,4,7-decatrienoate as an active perfuming or flavoring ingredient.

Another object of the invention is a perfumed or flavored article containing ethyl (2E,4Z,7Z)-2,4,7-decatrienoate as an active perfuming or flavoring ingredient.

The invention further provides a method to confer, improve, enhance or modify the pear, green, violet leaf type odor character of a perfuming composition or a perfumed article, which method comprises adding to said composition or article a fragrance effective amount of ethyl (2E,4Z,7Z)-2,4,7-decatrienoate.

Ethyl (2E,4Z,7Z)-2,4,7-decatrienoate is yet another object of the invention.

BACKGROUND OF THE INVENTION

Several isomers of ethyl decatrienoate, other than the above-mentioned compound, are known from the prior art. They are, in fact, naturally occurring compounds which have been found in certain pear varieties [see R. K. Creveling et al., J. Agr. Food Chem. 18, 19(1970)] and references cited therein] and in grapes [see P. Schreier et al., Can. Inst. Food. Sci. Technol. J. 14, 112 (1981)]. On the other hand, J. Bricout, in Ind. Alim. Agr. 1977 277, has reported the results of an analysis of William pear brandy wherein he tentatively postulated the presence of ethyl (2E, 4Z,7Z)-2,4,7-decatrienoate as one of the components, without however having confirmed his hypothesis. Furthermore, we have not found any mention, nor even suggestion, in the cited prior art, that these pear decatrienoates and, more particularly, ethyl (2E,4Z,7Z)-2,4,7-decatrienoate, might in any way be useful in perfumery. At the most, one might have imagined that, in view of the cited references, said compounds might have been useful to confer to flavoring compositions fruity notes of the pear and/or grape type, depending on the case.

PREFERRED EMBODIMENTS OF THE INVENTION

We have now discovered that ethyl (2E,4Z,7Z)-2,4,7-decatrienoate possesses very useful odor properties and that, as a result, it can be advantageously used in the preparation of perfuming compositions and perfumed articles of varied nature. It possesses in fact an odor note wherein the William pear type character is represented, but together with a green note reminiscent of cis-3-hexenyl benzoate [see S. Arctander, "Perfume and Flavor Chemicals", sect. 1612, Montclair, N.J., (1969)] and a violet leaf type headnote. The latter turns out to be particularly advantageous since it is reminiscent of the odor of methyl heptynecarbonate or octynecarbonate [see ref. cited, sects. 2045 and 2144] which are both products whose use in perfumery is restricted.

This combination of odor characters for ethyl (2E,4Z, 7Z)-2,4,7-decatrienoate, and its advantageous use in perfumery, are quite surprising and unexpected in view of the prior art. In fact, although there are examples of the use in perfumery of long chain esters having a fruity odor, such as for instance ethyl (2E,4Z)-2,4-decadienoate, also called "pear ester", such use is mostly rare and often restricted to applications wherein it is desired to reinforce the fruity character of the composition into which such compounds are incorporated [see, for example, U.S. Pat. No. 3,928,402].

Yet, although ethyl (2E,4Z,7Z)-2,4,7-decatrienoate is indeed capable of imparting to the compositions to which it is added the fruity character typical of the William pear, it further confers to said compositions a totally unexpected and very advantageous green, violet leaf note, all the more advantageous because it obviates the inconvenient use of the above-mentioned methyl heptyne carbonate and methyl octyne carbonate in the applications where these compounds are currently used. On the other hand, it has also been observed that the pear note of this decatrienoate, while reminiscent of that of the above-cited "pear ester", is much stronger than the latter.

As a result of its olfactive qualities, ethyl (2E,4Z,7Z)-2,4,7-decatrienoate can be used in compositions of varied nature. In effect, its use is just as advantageous in the fruity-pear type character compositions as it is in compositions having a floral, green, woody or yet mixed character. For these applications, the compound of the invention may be used alone or in admixture with other perfuming coingredients, solvents or adjuvants of current use in perfumery. It is not necessary to enumerate here such coingredients in a detailed manner, since the man in the art is quite able to find appropriate examples in reference textbooks such as that of S. Arctander cited above.

The ester which is the object of the present invention is useful in both fine and functional perfumery. Articles where it can be used as a perfuming ingredient include perfumes and colognes, soaps, shower and bath gels, shampoos and other hair-care products, body or air deodorants, detergents or fabric softeners or, yet, household products.

The concentrations in which ethyl (2E,4Z,7Z)-2,4,7-decatrienoate can be used to achieve the desired perfuming effects can vary in a wide range of values, which, as is well-known, depend on the nature of the article to be perfumed and on the olfactive effect desired. Thus, concentrations of the order of 5 to 10%, or even 20% of said ester, relative to the weight of composition, are quite appropriate whenever the compound is added to perfuming compositions of varied nature. Concentrations well below these values may be used when the compound of the invention is employed for perfuming various articles such as those cited above.

In addition, it has also been discovered that ethyl (2E,4Z,7Z)-2,4,7-decatrienoate is very useful for the flavor industry and that it can be employed for flavoring a wide variety of compositions as is shown in the examples presented further on related to flavor applications. The above-mentioned compound possesses a green, metallic, vegetable, gas, sulfur-like and acrylic flavor note, particularly reminiscent of the carveol acetate aromatic note.

The flavor properties of this compound are such that its field of application is very wide and that the flavor effects that can be obtained by adding this compound to base flavoring compositions are extremely varied. Thus, it can be advantageously used to confer, improve, enhance or modify the organoleptic properties of base flavoring compositions of the mint, cassis, pineapple, orange, exotic fruits or even rhum, watercress, mustard or broccoli type, wherein ethyl (2E,4Z,7Z)-2,4,7-decatrienoate can be used to reinforce the base note, as in the case of mint flavors, as well as to impart or strengthen the fresh and juicy tonalities, as in the fruity type compositions. These flavoring effects are described in more detail in the application examples presented further on.

In order to achieve the desired flavoring effects, the compound of the invention is preferably used in relatively low concentrations, typically of the order of 0.1 to 1% by weight, relative to the weight of the composition. It goes without saying that, depending on the application, these values can vary, but the man in the art knows by experience how to modify said values as a function of the nature of the other ingredients in the composition and of the desired flavoring effect.

The compounds of the invention can be used to flavor various articles such as foodstuffs, beverages, chewing gums, toothpastes or yet pharmaceutical preparations.

Foodstuffs that may be thus flavored include ice-creams, dessert creams, yoghurts, dairy products in general, bakery or confectionery products, syrups, candies, jams or yet, soups and stocks, extracts for the preparation of soups and sauces, spices or, in general, products intended for emulating the flavor characters of the vegetables and spices cited above. One can also cite foods such as chips and crackers, snacks or others.

The compounds of formula (I) are incorporated into the foods, beverages, chewing gums, toothpastes or pharmaceutical preparations to be flavored according to the methods current in the art, either alone, or in admixture with other natural or synthetic flavoring ingredients. They can be used as such, or in solution in one of the usual edible solvents such as triacetin, ethanol or propylene glycol, or yet in admixture on a solid carrier, for example dextrine or gum arabic.

Ethyl (2E,4Z,7Z)-2,4,7-decatrienoate can be prepared via a Wittig type reaction between (3Z)-hexenyl-triphenylphosphonium bromide and ethyl 4-oxo-(2E)-butenoate. These two starting products can be prepared as described, respectively, by B. Maurer et al. in Helv. Chim. Acta 65, 462 (1982) and P. L. Stotter et al. in Tetrahedron Lett. 1973, 2417. The compound of the invention was thus prepared as follows: two charges of 42.5 g (0.1 mole) of (3E)-hexenyl-triphenylphosphonium bromide in suspension in 300 ml of absolute ether were treated, under stirring and at 15°/20° C., with 55.5 ml (0.1 mole) of 1.8M n-butyllithium hexane solution. The mixture became intensely red and the crystals disappeared. Stirring was continued for 2 h at 20° C. 14.1 G (0.11 mole) of ethyl 4-oxobutenoate, in solution in 100 ml of absolute ether, were then added while keeping the temperature between 0 et 10°. A precipitate formed and the solution became yellow-brown. Stirring was continued for 2 h at 20° C. The reaction mixture was poured into an ice-cold saturated solution of ammonium chloride and the organic phase was decanted. The aqueous phase was further extracted with ether (200 ml). The product was washed successively with 1N HCl (100 ml), sat. NAHCO$_3$ (100 ml), water (100 ml) and water saturated with salt (100 ml). After drying over MgSO$_4$ and concentrating under reduced pressure, 30 g of raw product were obtained. The latter was diluted in pentane (2×200 ml), but part of the product turned out to be insoluble. The mixture was placed in a refrigerator for a few hours and the pentane solution was then decanted and concentrated under reduced pressure. The first such treatment provided 14.1 g of extract and the second 2.9 g. The two extracts were combined and distilled in a bulb-to-bulb apparatus (B.p. 90°-100° C./53 Pa) to give 10.4 g of a mixture containing 60% of the desired ester. This mixture was chromatographed on a SiO$_2$ (300 g) column, using a mixture of cyclohexane/ether 99:1 as eluting agent, to yield three fractions, one of which contained 7.2 g of the desired ester in a pure form. This fraction was further purified on a Vigreux column (~10 cm) at ~58°-60° C./40 Pa to give 5.86 g of pure ethyl (2E,4Z,7Z)-2,4,7-decatrienoate (yield: 7%) whose analytical data were the following:

NMR($^1$H, 360 MHz): 0.99(t,J=7 Hz,3H);1.31(t, J=7 Hz,3H);2.10(dxq, J=7,7 Hz, 2H); 3.05(dxd, J=7, 7Hz, 2H); 4.22(q, J=7 Hz, 2H); 5.31(dxt, J=7, 11 Hz, 1H); 5.46(dxt, J=7, 11 Hz, 1H); 5.81(dxt, J=7,11 Hz,1H); 5.88(d, J=14 Hz, 1H); 6.13(dxd, J=11,11 Hz,1H); 7.66(dxd, J=11,14 Hz, 1H) δppm.

NMR($^{13}$C, 90 MHz) :167.2(s);139.1(d);133.3(d); 126.5(d); 125.4(d); 121.8(d); 60.3(t); 26.5(t); 20.6(t); 14.3(q); 14.1(q) δppm.

MS:194(2), 179(1), 165(3), 149(9), 133(3), 121(39), 105(24), 97(36), 91(64), 79(100), 67(26), 55(41), 43(40).

The invention will now be described in further detail by way of the following examples.

EXAMPLE 1

Perfuming Composition

A base perfuming composition of the fruity-pear type was prepared by admixing the following ingredients:

| Ingredients | Parts by weight |
| --- | --- |
| Hexyl acetate | 1 |
| Octyl acetate | 1 |
| TCD acetate [1] | 10 |
| Methyl cinnamate | 3 |
| Y-Dodecalactone | 1 |
| 10% * Y-Decalactone | 6 |
| 60% ** β-Damascone | 3 |
| Isopentyrate [2] | 2 |
| Myroxyde ® [3] | 1 |
| Veloutone [4] | 7 |
| 50% * Bourgeonal ® [5] | 1 |
| Linalol | 13 |
| Linalyl acetate | 16 |
| Lilial ® [6] | 5 |
| Galaxolide ® [7] 50 | 20 |
| Mayol ® [8] | 5 |
| Total | 95 |

* in dipropyleneglycol
** in ethyl citrate
[1] (tricyclo[5.2.1.0$^{2,6}$]dec-4-yl)methyl acetate; origin: Firmenich SA, Geneva, Switzerland
[2] 1,3-dimethyl-3-butenyl isobutyrate; origin: Firmenich SA, Geneva, Switzerland
[3] mixture of isomers of ocimen epoxyde; origin: Firmenich SA, Geneva, Switzerland
[4] 2,5,5-trimethyl-2-pentyl-cyclopentanone; origin: Firmenich SA, Geneva, Switzerland
[5] 3-(4-tert-butyl-1-phenyl)propanal; origin: Quest International
[6] 3-(4-tert-butyl-1-phenyl)-2-methylpropanal; origin: L. Givaudan, Vernier, Switzerland
[7] 1,3,4,6,7,8-hexahydro-4,6,6,7,8,8-hexamethyl-cyclopenta[g]isochromene; origin: IFF Inc., USA
[8] 4-isopropyl-cyclohexylmethanol; origin: Firmenich SA, Geneva, Switzerland When 5 to 10% by weight, relative to the weight of composition, of ethyl (2E,4Z,7Z)-2,4,7-decatrienoate were added to this base composition, a new composition was obtained the odor of which possessed a clear and very natural William pear character, reminiscent of the natural and juicy pear character. The chemical note of the base composition had completely vanished and the original note of slightly green fruit had been replaced by a very natural note of ripe pear.

EXAMPLE 2

Perfuming Composition

A base perfuming composition intended for a masculine cologne was prepared by admixing the following ingredients:

| Ingredients | Parts by weight |
|---|---|
| 10% * Geranyl acetate | 50 |
| 10% * Neryl acetate | 80 |
| Linalyl acetate | 140 |
| Undecalactone | 80 |
| Benzyl benzoate | 500 |
| Bergamot essential oil | 1120 |
| Lemon essential oil | 120 |
| Coumarine | 100 |
| Dihydromyrcenol [1] | 160 |
| 10% * Eugenol | 80 |
| Galaxolide ® [2] 50 | 1000 |
| Hydroxycitronellal | 30 |
| 10% * Indol | 50 |
| Isobutylquinoleine [3] | 20 |
| Isocyclemone E [4] | 2080 |
| Lyral ® [5] | 500 |
| Mandarine essential oil | 580 |
| Cristal moss [6] | 280 |
| Nutmeg essential oil | 60 |
| Hedione ® [7] | 210 |
| Patchouli essential oil | 140 |
| Amyl salicylate | 160 |
| Sandela ® [8] | 300 |
| Tonalid ® [9] | 820 |
| Vertofix coeur [10] | 980 |
| 10% * Violet essential oil | 80 |
| 10% * 2,4-dimethyl-3-cyclohexene-2-carbaldehyde [11] | 60 |
| 10% * 1-(2,6,6-trimethyl-1-cyclohexyl)-3-hexanol [11] | 120 |
| Total | 9900 |

* in dipropyleneglycol
[1] 2,6-dimethyl-7-octen-2-ol; origin: IFF Inc., USA
[2] see Example 1
[3] 6-(1-methylpropyl)quinoleine; origin: IFF Inc., USA
[4] isomeric mixture of 2-acetonaphthone-1,2,3,4,5,6,7,8-octahydro-2,3,8,8-tetramethyl; origin: IFF Inc., USA
[5] 4-(4-hydroxy-4-methylpentyl)-3-cyclohexene-1-carboxaldehyde; origin: IFF Inc., USA
[6] methyl 2,4-dihydroxy-3,5-dimethylbenzoate
[7] methyl dihydrojasmonate; origin: Firmenich SA, Geneva, Switzerland
[8] isomeric mixture 3-(isocamphyl-5-)-cyclohexan-1-ol; origin: L. Givaudan, Vernier, Switzerland
[9] 7-acetyl-1,1,3,4,4,6-hexamethyltetraline; origin: PFW Inc., Netherlands
[10] origin: IFF Inc., USA
[11] origin: Firmenich SA, Geneva, Switzerland To this base composition of the citrus-green-woody type, there were added 100 parts by weight of ethyl (2E,4Z,7Z)-2,4,7-decatrienoate. The new composition thus obtained acquired a green character with a connotation of violet leaves. The addition of the above-mentioned compound to the base composition made it possible to obtain an olfactive effect which was judged similar to the odor effect that one would have obtained, in the same circumstances, should methyl heptyne- or octynecarbonate have been added.

EXAMPLE 3 a) Mint Type Flavoring Composition

A base composition of the mint type was prepared by admixing the following ingredients:

| Ingredients | Parts by weight |
|---|---|
| 10%* Carveol acetate | 10 |
| laevo-Carvone | 200 |
| Eucalyptol | 5 |
| Menthone | 60 |
| 10%* Menthofuran | 10 |
| Phenylethyl alcohol | 5 |
| Terpineol | 5 |
| Triacetin | 705 |
| Total | 1000 |

*in triacetin

The mint base thus obtained was then used in the preparation of two flavoring compositions by admixture with the following ingredients:

| Ingredients | Compositions (parts by weight) | |
|---|---|---|
| | A | B |
| Mint base | 50 | 50 |
| 10%* Ethyl(2E,4Z,7Z)-2,4,7-decatrienoate | — | 5 |
| 95% Ethanol | 950 | 945 |
| | 1000 | 1000 |

*in 95% ethanol

These two compositions were then evaluated by a panel of nine expert flavorists, at 0.1% in sweetened acidulated spring water (10% sugar, 0.1% citric acid). The experts preferred composition B, having judged that it possessed a clearly enhanced carvone, spearmint flavor when compared to the base composition.

b) Spearmint and Peppermint Essential Oils

The compound of the invention was also added to a spearmint essential oil and to a peppermint essential oil in 0.2% by weight. The new essential oils thus obtained were then evaluated by the expert flavorists. The latter found them improved in flavor, the carvone and carveol acetate character of the spearmint oil having been enhanced by the addition of ethyl (2E,4Z,7Z)-2,4,7-decatrienoate, and the peppermint oil possessing then more body.

EXAMPLE 4

Fruity Base Composition, of the Cassis Type

A base composition of the cassis type was prepared by admixing the following ingredients:

| Ingredients | Parts by weight |
|---|---|
| Ethyl acetate | 10 |
| Acetic acid | 10 |
| 4-p-Hydroxy-phenylbutanone | 105 |
| Ethyl butyrate | 150 |
| Maltol | 10 |
| Ethyl methylbutyrate | 5 |
| Dimethylsulfide | 30 |
| 10%* Methylcyclopentenolone | 5 |
| cis-3-Hexenol | 5 |
| Triacetin | 610 |
| Vanilline | 25 |
| 10%* α-Ionone | 10 |
| Buchu essential oil | 5 |
| 10%* Methylbutyric acid | 5 |
| 1%* Mercaptomenthone | 15 |
| Total | 1000 |

*in triacetin

The cassis base thus obtained was then used in the preparation of two compositions by admixture with the following ingredients:

| Ingredients | Compositions (parts by weight) | |
| --- | --- | --- |
| | A | B |
| Cassis base | 100 | 100 |
| 10%* Ethyl(2E,4Z,7Z)-2,4,7-decatrienoate | — | 10 |
| 95% Ethanol | 900 | 890 |
| | 1000 | 1000 |

*in 95% ethanol

Compositions A and B were then evaluated under the conditions described in Example 3. According to the experts, composition B possessed a more juicy cassis flavor than composition A.

EXAMPLE 5

Fruity Flavoring Composition, of the Pineapple Type

A base composition of the pineapple type was prepared by admixing the following ingredients:

| Ingredients | Parts by weight |
| --- | --- |
| Ethyl butyrate | 50 |
| Allyl caproate | 50 |
| Ethyl caproate | 20 |
| δ-Dodecalactone | 5 |
| 2,5-Dimethyl-4-hydroxy-3(2H)-furanone | 100 |
| Methyl methylthiopropionate | 5 |
| Triacetin | 770 |
| Total | 1000 |

This pineapple base composition was then used in the preparation of two compositions by admixture with the following ingredients:

| Ingredients | Compositions (parts by weight) | |
| --- | --- | --- |
| | A | B |
| Pineapple base | 100 | 100 |
| 10%* Ethyl(2E,4Z,7Z)-2,4,7-decatrienoate | — | 5 |
| 95% Ethanol | 900 | 895 |
| | 1000 | 1000 |

*in 95% ethanol

Compositions A and B were then evaluated in the conditions described in Example 3. The expert flavorists preferred composition B, which possessed a pineapple flavor with an enhanced fresh and fibrous tonality.

EXAMPLE 6

Mango Type Flavoring Composition

A mango type base composition was prepared by admixing the following ingredients:

| Ingredients | Parts by weight |
| --- | --- |
| 10%* Buchu essential oil | 15 |
| Ethyl butyrate | 100 |
| Ethyl caproate | 50 |
| γ-Decalactone | 30 |
| Geranyl butyrate | 20 |
| Hexanal | 5 |
| cis-3-Hexenol | 10 |
| Hexyl acetate | 40 |
| Hexyl caproate | 40 |
| 0.1%* α-Ionone | 10 |
| Isobutyl cinnamate | 30 |
| TETRAROME ® orange [1] | 20 |
| TETRAROME ® lemon [2] | 25 |
| 95% Ethanol | 605 |
| Total | 1000 |

*in ethanol
[1] deterpenated orange essential oil; origin: Firmenich SA, Geneva, Switzerland
[2] deterpenated lemon essential oil; origin: Firmenich SA, Geneva, Switzerland The mango type base composition was then used in the preparation of two compositions by admixture with the following ingredients:

| Ingredients | Compositions (parts by weight) | |
| --- | --- | --- |
| | A | B |
| Mango base | 100 | 100 |
| 10%* Ethyl(2E,4Z,7Z)-2,4,7-decatrienoate | — | 10 |
| 95% Ethanol | 900 | 890 |
| | 1000 | 1000 |

*in 95% ethanol

Upon evaluation of these two compositions, in the conditions described in Example 3, the expert flavorists preferred composition B which, in their opinion, possessed a rounder aromatic note than composition A.

EXAMPLE 7

Orange Type Flavoring Composition

A base flavoring composition of the orange type was prepared by admixing the following ingredients:

| Ingredients | Parts by weight |
| --- | --- |
| Ethyl acetoacetate | 3 |
| 10%* Hexanal | 4 |
| 10%* Octanal | 2 |
| Ethyl butyrate | 2 |
| 10%* Caryophyllene | 5 |
| 10%* Acetaldehyde | 15 |
| Grapefruit essential oil | 5 |
| TETRAROME ® lemon [1] | 5 |
| Mandarin essential oil | 2 |
| Acetic aldehyde | 60 |
| Orange essential oil | 987 |
| Total | 1000 |

*in orange essential oil
[1] see Example 6

The orange base thus obtained was used in the preparation of two compositions by admixture with the following ingredients:

| Ingredients | Compositions (parts by weight) | |
| --- | --- | --- |
| | A | B |
| Orange base | 100 | 100 |
| 1%* Ethyl(2E,4Z,7Z)-2,4,7-decatrienoate | — | 10 |
| 95% Ethanol | 900 | 890 |
| | 1000 | 1000 |

*in 95% ethanol

Compositions A and B were then evaluated in the conditions described in Example 3. According to the expert flavorists, composition B possessed a more juicy note than composition A.

EXAMPLE 8

Rhum Type Flavoring Composition

A base flavoring composition of the rhum type was prepared by admixing the following ingredients:

| Ingredients | Parts by weight |
| --- | --- |
| Isobutyric acid (redist.) | 5 |
| 50%* Sumatra benzoin oil | 10 |
| Ethyl butyrate | 20 |
| 10%* China cinnamon oil | 5 |
| 10%* Ethyl caproate | 10 |
| 10%* English clove oil | 10 |
| 10%* Ethyl lactate | 15 |
| Concentrated rhum | 910 |
| Vanilline | 20 |
| Total | 1000 |

*in 95% ethanol

The rhum base was then used to prepare two flavoring compositions by admixture with the following ingredients:

| | Compositions (parts by weight) | |
| --- | --- | --- |
| Ingredients | A | B |
| Rhum base | 500 | 500 |
| 1%* Ethyl(2E,4Z,7Z)-2,4,7-decatrienoate | — | 25 |
| 95% Ethanol | 500 | 475 |
| | 1000 | 1000 |

*in 95% ethanol

Upon evaluation in the conditions described in Example 3, the experts flavorists preferred composition B which, in their opinion, possessed a rhum flavor whose typical phenolic and pyrogenous character was enhanced compared to composition A.

What we claim is:

1. A perfuming composition with a pear, green, violet leaf type odor character, containing ethyl (2E,4Z,7Z)-2,4,7-decatrienoate as an active perfuming ingredient.

2. A perfumed article with a pear, green, violet leaf type odor character, containing ethyl (2E,4Z,7Z)-2,4,7-decatrienoate as an active perfuming ingredient.

3. A perfumed article according to claim 2, in the form of a perfume or cologne, a soap, a shower or bath gel, a shampoo, a body or air deodorizer, a detergent or a fabric softener, or a household product.

4. A method to confer, improve, enhance or modify the pear, green, violet leaf type odor character of a perfuming composition or a perfumed article, which method comprises adding to said composition or article a fragrance effective amount of ethyl (2E,4Z,7Z)-2,4,7-decatrienoate.

5. Ethyl (2E,4Z,7Z)-2,4,7-decatrienoate.

* * * * *